UNITED STATES PATENT OFFICE.

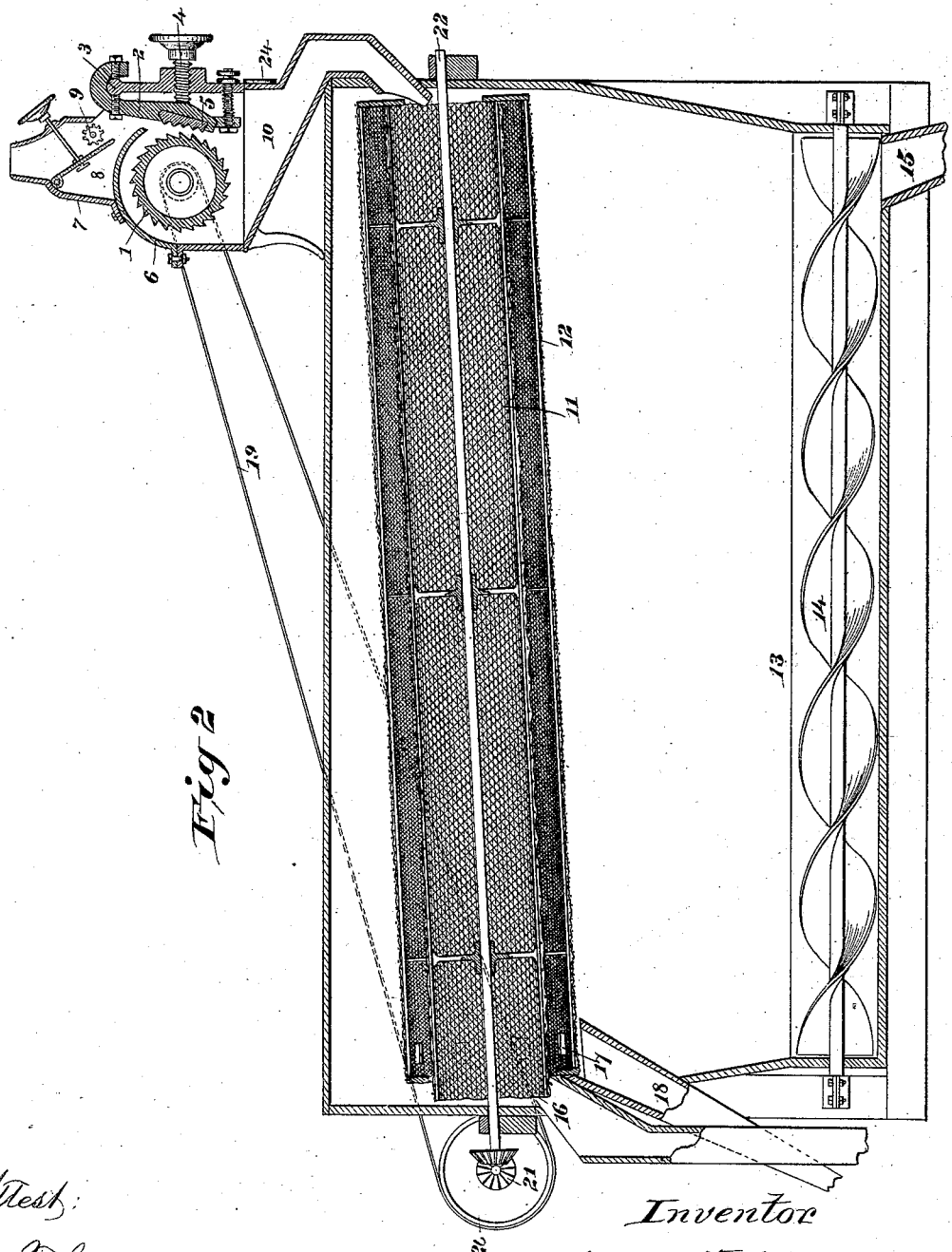

JOHN M. CASE, OF COLUMBUS, OHIO, ASSIGNOR TO THE CASE MANUFACTURING COMPANY, OF SAME PLACE.

GRAIN REDUCTION AND SEPARATING MACHINE.

SPECIFICATION forming part of Letters Patent No. 297,761, dated April 29, 1884.

Application filed May 31, 1883. (No model.)

*To all whom it may concern:*

Be it known that I, JOHN M. CASE, a citizen of the United States, residing at Columbus, in the county of Franklin and State of Ohio, have invented certain new and useful Improvements in Grain Reduction and Separating Machines, of which the following is a specification.

This invention relates to an improved machine for splitting wheat and separating the germ and impure matter which may be confined within the crease of the wheat.

It consists of a machine comprising devices for splitting the grain, and a compound reel constructed in such a manner that three separations may be made, the broken wheat passing off by one spout, the germ which has been removed from the grain by another spout, and the flour or seam impurities which may have been liberated by another spout. The reel employed for this purpose is double, being formed with an inner wire-cloth screen and a finer outer screen of bolting-cloth, and the reel and cracking devices are both mounted in the same frame and driven by the same connections.

In this invention I use a wheat-reduction machine for which I have already obtained Letters Patent, or any other form of wheat-reduction-machine may be employed; but I prefer this machine on account of its simplicity and effectiveness in operation.

In the accompanying drawings, Figure 1 is a front view of the apparatus. Fig. 2 is a vertical longitudinal section, showing the breaking and separating mechanism more fully.

The breaking-machine here represented consists of a toothed roller, 1, and a concave, 2, supported on the fulcrum 3 and adjusted by means of screws 4, and carrying a toothed face-plate, 5, which, by means of the screws 4, is set at any required distance from the breaking-roller 1. This breaking mechanism works in a casing, 6, surmounted by a hopper, 7, in which are an adjustable feed-board, 8, and a corrugated roller, 9, to regulate the feed. By this apparatus the wheat is split longitudinally in halves. In this breaking operation the germ at the end of the wheat becomes liberated, and also any impure matter which may be confined in the seam of the grain. This broken wheat and liberated product pass through the spout 10 to the double reel below. The inside reel, 11, is made with wire-cloth, of mesh sufficiently coarse and open to permit all the germ or middlings that may have been made in the breaking operation to drop through the meshes of the wire-cloth. This product, dropping through the central or inner reel, falls upon a silk bolting-cloth upon the outer reel, 12, which is of greatly-reduced mesh, being in practice ordinarily about No. 12 bolting-cloth. This silk cloth retains the germ and middlings, the dust from which falls down into the box or trough 13, and is conducted off by the conveyer 14 and spout 15. This product, taken off through the spout 15, is very impure, and is ordinarily used for feed. The product passing over the tail of the reel 11 at 16 consists of half-grains of wheat. This may be sent to the machines for additional reductions, or it may be sent to the ordinary millstone for grinding into flour. The germ and middlings product, passing through the screen 11 and out through the openings 17 in the screen 12, drops down into the hopper or spout 18, and is conducted off and ordinarily sent to smooth rolls for the purpose of crushing or for further treatment.

In this invention I accomplish the removal of the germ product and the impure material which becomes embedded within the crease of the wheat-berry in one common machine.

I am aware that bolts have been made with cloth placed within cloth or a double reel; but my invention combines in one common frame a reduction-machine and a bolting apparatus, whereby the wheat is broken and three complete separations of the material are made. The coarse inner reel is of wire-cloth to adapt it to endure the wear from the passage over its surface of the broken grain, while the outer reel is necessarily of silk cloth sufficiently fine to separate the dust and fine impurities from the middlings and germ.

The rotation of the double reel may be effected by any suitable mechanism—as, for example, a belt, 19, driven by a pulley on the shaft of the roll 1, and running a pulley, 20, connected by bevel-pinions 21 with the reel-shaft 22.

The reels may, if preferred, be driven inde- (No Model.)
J. M. CASE.
PROCESS OF REDUCING GRAIN TO MIDDLINGS AND FLOUR.
No. 297,762. Patented Apr. 29, 1884.
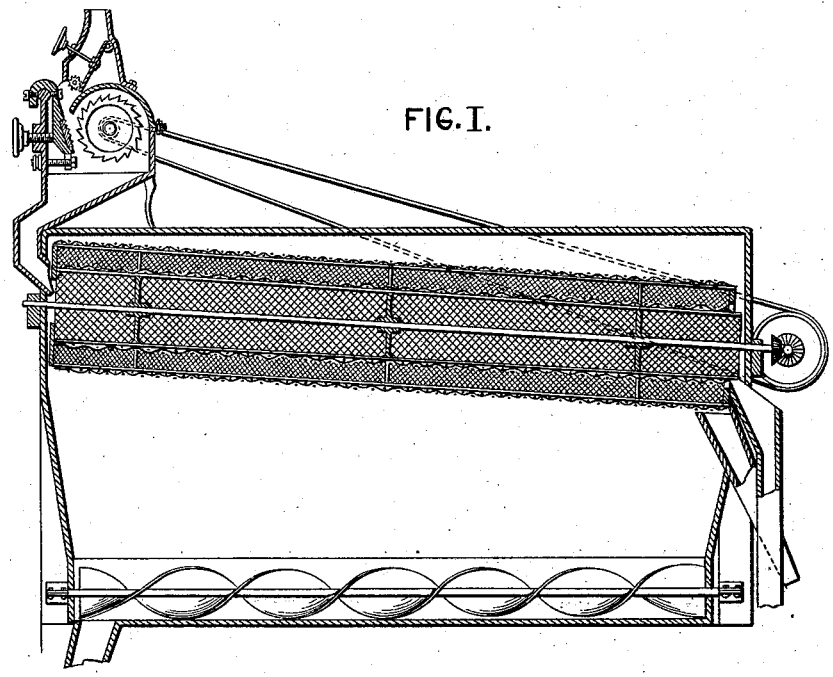
FIG. I.
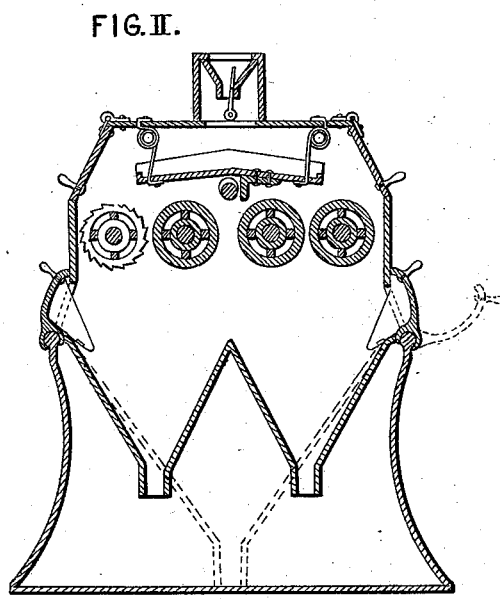
FIG. II.
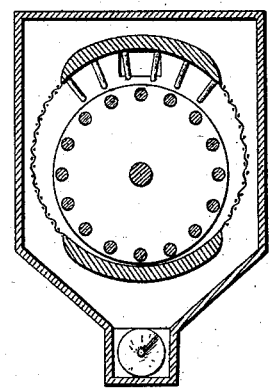
FIG. III.
ATTEST.
J. Henry Kaiser.
Geo. T. Smallwood.
INVENTOR.
John M. Case
By Knight Bros
Attorneys